Patented Dec. 12, 1933

1,938,691

UNITED STATES PATENT OFFICE 1,938,691

ENAMEL WARE

William E. Dougherty, Pittsburgh, Pa., assignor to The O. Hommel Company, a corporation of Pennsylvania No Drawing. Application December 9, 1930
Serial No. 501,079

7 Claims. (Cl. 106—36.2)

My invention relates to improvements in the production of enamel ware, and the object in view is reduction of cost without loss of quality. This application is in part a continuation of two applications for Letters Patent filed by me November 6, 1928, Serial No. 317,691, and January 9, 1929, Serial No. 331,394.

In the manufacture of enamel ware, that is to say of articles having a body or base of metal and a superficial coating of glass, and particularly in the manufacture of such articles as vitreous enameled cooking utensils, vitreous enameled signs, tile, etc., whiteness and opacity are ordinarily obtained by combining with the pulverized glass which is to be applied to the metal surface, tin oxide ($SnO_2$) in finely divided condition.

The desirability of finding a material less expensive than tin oxide has been recognized, but no satisfactory substitute has hitherto been found. In the pottery industry titanium oxide ($TiO_2$) has long been known; and, particularly as processes of refining have been developed, the proposal has been made to employ titanium oxide in place of tin oxide in the enameling of iron articles. The proposal has not hitherto proved practicable. The glaze upon pottery is fused at a temperature of 2000° F. or thereabouts, but in the enameling of iron articles, and, particularly, in the enameling of sheet steel articles (kitchenware and the like), no such temperature is permissible. An iron article with its enamel coat must be fused at a temperature not exceeding 1700° F. an any case; and, in sheet steel articles, at a temperature not exceeding 1600° F. in the ground coat, and in the finishing coat or coats not exceeding 1540° F. The glass composition is necessarily different from the composition of pottery glazes. Furthermore, the composition must be such as to afford a glass having a coefficient of thermal expansion substantially the same as that of iron. Under such limitations, it has not hitherto been found practicable to employ titanium oxide as an opacifying medium. If used in quantity sufficient to give whiteness, the titanium oxide containing coating cannot afford, within the limits of temperature otherwise imposed, a coating of proper and adequate gloss. Nothing is possible but a dull surface.

The invention lies in the discovery that, by specific control of the glass composition, titanium oxide may be employed to afford opacity in proper degree and yet the resulting coating will have a proper and adequate gloss.

In the compounding of the batch—that is to say, in the glass composition—it is usual, indeed it has hitherto been the general practice, to employ cryolite or other fluorine-containing compounds, in order to bring the temperature of fusion within the range permissible in the iron-enameling art. I have discovered that, if from the glass composition fluorine be excluded, and if by the employment of other ingredients the desired low temperature of fusion be achieved, a relatively small quantity of titanium oxide will serve as an opacifying agent, and will afford a result in no respect inferior, either in opacity, whiteness, or gloss, to that of the more expensive tin oxide; and I have further discovered that, even if fluorine be present in the glass composition in a relatively small ratio, its otherwise prejudicial effect upon the use of titanium oxide may, by associating with it other particular ingredients, be avoided and corrected.

A typical formula for a glass free of fluorine, and therefore suitable for the practice of my invention, may be compounded of the following ingredients:

|  | Percent by weight |
|---|---|
| Borax | 16.5 |
| Feldspar | 50.45 |
| Silica | 9.20 |
| Soda ash | 20.25 |
| Sodium nitrate | 3.00 |

The batch of such composition is smelted in the ordinary manner and the resulting glass is for the purpose in view brought to solid form in subdivided or broken-up condition. If to the glass so compounded titanium dioxide be added in the ratio of 8%, and if the whole be ground to the desired degree of fineness, as the art knows, and then applied in known manner to the metal body, and the coated article fired, the opacifying effect of the titanium oxide will be found to be not inferior to, but indeed superior to, that of tin oxide.

I have additionally found that the presence of a small amount of fluorine in the glass need not be detrimental, and that, if the titanium oxide be combined in sufficient quantity with the crushed glass, such small amount of fluorine will be ineffective to diminish the opacifying effect. I have found that, employing titanium dioxide in the ratio of 8%, named above, fluorine in the glass will not be prejudicial to the result, if in quantity it does not exceed 2%; I have found that if the quantity of fluorine present in the glass does not greatly exceed 2%, its otherwise deleterious effect upon opacifying may be prevented by increasing accordingly the quantity of titanium dioxide used. Since, in spite of its tendency to render opacifying ineffective, fluorine has value in the smelting of glass, it is desirable in certain cases to employ a glass in which fluorine is present in a quantity not greatly exceeding 2% (and such a quantity has value for smelting purposes), and to make the addition of titanium dioxide in an amount of 8% and upwards. A typical case of a glass containing the properly restricted amount of fluorine is the following:

| | Percent by weight |
|---|---|
| Borax | 16.50 |
| Feldspar | 45.85 |
| Silica | 12.40 | 
| Soda ash | 18.00 |
| Cryolite | 3.75 |
| Sodium nitrate | 3.00 |

In this case the fluorine present in the cryolite does not exceed 2% of the whole. To the glass so compounded, after it has been formed and solidified, titanium dioxide is added in quantity of approximately 8%, and the opacifying effect is all that can be desired.

I have further found that if in the composition of a glass batch in which fluorine is present (in the form of cryolite, for example) calcium also be present (in the form of a suitable salt, the carbonate for example), or if another element of the calcium group (which includes calcium, barium, magnesium, and strontium) be present in the form of a suitable salt, and if such second element be so present in suitable quantity, titanium dioxide may be employed with utmost success as an opacifier. For example, a glass batch may be compounded as follows:

| | Percent by weight |
|---|---|
| Borax | 14.85 |
| Feldspar | 30.83 |
| Silica | 18.45 |
| Soda ash | 11.25 |
| Cryolite | 11.93 |
| Sodium nitrate | 2.70 |
| Calcium carbonate | 10.30 |

In this case fluorine is present in the glass in a ratio as great as 6%, but, additionally, calcium carbonate is present in an amount to negative the fluorine and to prevent the unfavorable effect which otherwise it would have upon opacification. To the crushed glass derived from this mix titanium dioxide may be added in the radio named above (8%) with a resulting opacification which is thoroughy satisfactory.

I have found that if fluorine be present in the glass batch its tendency to render titanium dioxide ineffective as an opacifier may be negatived and overcome by adding to the batch a properly measured amount of a suitable compound of titanium itself; the carbonate, for example, or the oxide; and I have found that the same corrective effect may be gained by adding to the glass batch a corresponding quantity of an oxide (or other suitable compound) of another member of the group of metals in which titanium is found (the group which comprises titanium, zirconium, thorium, and cerium). The following is in this case a typical batch composition:

| | Percent by weight |
|---|---|
| Borax | 16.50 |
| Feldspar | 34.25 |
| Silica | 20.50 |
| Soda ash | 12.50 |
| Cryolite | 13.25 |
| Sodium nitrate | 3.00 |
| Titanium dioxide | 3.00 |

In this case fluorine is present in the glass in a ratio of 7% and the titanium dioxide present in the composition of the batch is sufficient to negative and correct the injurious effect of fluorine upon opacification. As in the other cases, the addition of 8% of titanium dioxide to the resulting crushed glass will be effective for opacifying purposes in enamel making.

I do not mean to limit myself to nor to confine my invention by any theory; but by investigation I have discovered that it is fluorine (itself in some degree an opacifying agent, by virtue of minute bubbles appearing in the glass) which when present in glass is preventive of or prejudicial to opacification by the use of titanium dioxide. The effect of the fluorine upon the titanium dioxide additions seems to be that of solution. I have discovered that this prejudicial effect may be corrected and overcome by keeping down and within permissible limits the quantity of fluorine present in the glass, and, additionally, by satisfying the avidity which the fluorine in such situation manifests. This satisfying may be accomplished by introducing into the glass batch titanium oxide, or the oxide of another element of the titanium group, or carbonate of calcium, or the carbonate of another element of the calcium group, or by mixing with the crushed glass a quantity of titanium dioxide in excess of what in the absence of fluorine would be required for opacifying purposes alone. Thus it appears that in the practice of my invention titanium dioxide becomes effective as an opacifier for glass if the glass be free of fluorine, or if (containing fluorine) its fluorine content be satisfied. In either case the glass is free of fluorine in active condition; and that essential and characteristic condition of the glass I characterize in the claims.

I have designated 8% as a suitable quantity of titanium dioxide to be added to a crushed glass free of fluorine, and I have said that, if fluorine be present in the glass in an amount not greatly exceeding 2%, its otherwise injurious effect may be negatived by a corresponding increase in the size of the titanium dioxide addition. I have found that an addition of titanium dioxide to the crushed glass in an amount ranging from 4 to 15% will cover the field in contemplation. Since, apart from the matter of fluorine content, there is a range of variation in the composition of the glass employed, it is not possible to define with greater precision the percentage of the titanium dioxide addition. In practice, and within the limits named, the particular amount required for a particular glass mix may be empirically determined.

The degree of opacification is determined by reflectance test. Instruments are in general use in the industry, and a standard has been set up. It is requisite that, to be acceptable, an enameled article shall have a reflectance of at least 59%; and it is permissible that such degree of opacity be afforded by two coats successively applied and fired. Surface gloss is a result of complete fusion, and is not attainable otherwise than by the complete fusion of the applied enamel.

For the reasons indicated, titanium dioxide, proposed as an opacifier, has not heretofore been used with commercial success; the industry has continued to carry the heavier cost burden involved in the use of tin dioxide. It is a well-recognized fact that tin dioxide may not be employed with satisfaction as an ingredient of the initial coat upon a steel surface, because the coat, if it contains tin dioxide, tends to blister upon the steel surface. The initial coat then, lacking an opacifier, is relatively transparent. In consequence, more coats or heavier coats of tin-oxide containing material must be laid upon the initial coat, in order to attain the desired whiteness of product. Titanium dioxide, I have found, does not present this difficulty. It may be employed in the initial coat without blistering effect. Accordingly, employing titanium dioxide in place of tin dioxide as an opacifier, under the conditions and limitations described above, opacification may be practiced in forming the initial coating, and the desired whiteness of product may be attained with fewer coats or with thinner coats than can be obtained by the use of tin dioxide.

The use of titanium dioxide in the initial layer has another and incidental advantage. In the compounding of the material for the initial layer, a salt of cobalt is commonly employed, to afford better adhesion of the glass to the metal. This cobalt ingredient tends to give to the initial coat a bluish cast of color. By adding to the crushed glass for the initial coat titanium dioxide, under the conditions and limitations described, the tendency to blueness is corrected. In consequence, fewer coats or thinner coats will afford the desired whiteness of product. The titanium dioxide employed, as it may be, in the form of rutile, a native mineral, is adulterated slightly with iron. This, in the present circumstances, is not disadvantageous; the iron, tending to give a yellow cast to white enamel, counteracts the tendency to blue which the cobalt otherwise gives.

A typical glass mix for the initial coat is as follows:

| | Percent by weight |
|---|---|
| Borax | 31 |
| Feldspar | 25 |
| Silica | 24 |
| Soda ash | 12.5 |
| Calcium carbonate | 4.7 |
| Fluorspar | 2.3 |
| Cobalt oxide | 1.25 |

If to the crushed glass produced from this formula 8% of titanium dioxide be added, an opaque, white, unblistered initial coat may be formed upon the surface of the steel body.

In the foregoing specification I have assumed that the one who follows my instructions will proceed with the knowledge of the industry as to the details of compounding and smelting the glass batch, and subdividing and crushing the glass. Of the crushed glass (with the incorporated opacifier) he may prepare a slip, in which the article to be coated will be dipped; or, alternatively, he may sift the pulverized material upon the heated surface of the article. The details of firing too will be such as the industry teaches.

In a companion application, Serial No. 501,078, filed December 9, 1930, I have described and claimed a method in which fluorine present in the glass batch is rendered ineffective, by other ingredients added for that purpose, to prevent the opacifying effect of titanium dioxide as an opacifier when ground with the glass. In this application I claim generically the use of titanium dioxide as an opacifier when ground with glass in which fluorine is ineffective, whether by exclusion from the mix or by the masking of its otherwise normal effect.

I claim as my invention:

1. The method herein described of preparing an opaque enamel which consists in smelting to glass a batch of fluorine-free glass of substantially the following composition: borax, 16.5%; feldspar, 50.45%; silica, 9.20%; soda ash, 20.25%; sodium nitrate, 3%; and crushing the resultant glass together with approximately 8% titanium dioxide.

2. The method herein described of producing an opaque, white, enameled iron article which consists in firing upon the iron article at least two successively applied coats of glass opacified with titanium oxide, the glass containing silica with flux in sufficient amount to produce a glass melting at a temperature not exceeding 1700° F., and the titanium oxide being added in a quantity sufficient to afford in a doubly coated article a reflectance of at least 59%.

3. The method herein described of producing an opaque, white, enameled iron article which consists in firing upon the iron article at least two successively applied coats of glass opacified with titanium oxide, the glass consisting of silica with flux in sufficient amount to produce a glass melting at a temperature not exceeding 1700° F., such glass being further characterized by freedom from fluorine, and the titanium oxide being added in quantity sufficient to afford in a doubly coated article a reflectance of at least 59%.

4. The method herein described of producing an opaque, white, enameled iron article which consists in firing upon the iron article at least two successively applied coats of glass opacified with titanium oxide, the glass containing silica with fluorine-including flux in sufficient amount to produce a glass melting at a temperature not exceeding 1700° F., such glass being further characterized by the presence of a compound of the calcium group, and the titanium oxide being added in quantity sufficient to afford in a doubly coated article a reflectance of at least 59%.

5. The method herein described of producing an opaque, white, enameled iron article which consists in applying immediately as a ground coat upon the iron surface a coat of glass opacified with titanium oxide, the glass containing silica with flux in sufficient amount to produce a glass melting at a temperature not exceeding 1700° F., and the titanium oxide being added in quantity sufficient to afford in a doubly coated article a reflectance of at least 59%.

6. An opaque, white, enameled iron article carrying at least two coats of an enamel melting at less than 1700° F. and opacified with titanium oxide, the surface of the coated article having a reflectance of at least 59%.

7. An opaque, white, enameled iron article carrying at least two coats of an enamel free of fluorine, melting at less than 1700° F. and opacified with titanium oxide, the surface of the coated article having a reflectance of at least 59%.

WILLIAM E. DOUGHERTY.